(12) United States Patent
Wang

(10) Patent No.: US 12,612,517 B2
(45) Date of Patent: Apr. 28, 2026

(54) ASPHALT EMULSION AND METHOD OF FORMING THE SAME

(71) Applicant: HONEYWELL INTERNATIONAL INC., Charlotte, NC (US)

(72) Inventor: Wei Wang, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 626 days.

(21) Appl. No.: 17/658,826

(22) Filed: Apr. 12, 2022

(65) Prior Publication Data

US 2022/0332950 A1      Oct. 20, 2022

Related U.S. Application Data

(60) Provisional application No. 63/175,745, filed on Apr. 16, 2021.

(51) Int. Cl.
| | |
|---|---|
| *C08L 95/00* | (2006.01) |
| *C08K 5/09* | (2006.01) |
| *C08K 5/20* | (2006.01) |
| *C08L 23/06* | (2006.01) |

(52) U.S. Cl.
CPC .............. *C08L 95/005* (2013.01); *C08K 5/09* (2013.01); *C08K 5/20* (2013.01); *C08L 23/06* (2013.01); *C08K 2201/019* (2013.01); *C08L 2207/062* (2013.01); *C08L 2555/28* (2013.01)

(58) Field of Classification Search
CPC .. C08L 95/005; C08L 23/06; C08L 2207/062; C08L 2555/00; C08L 91/06
See application file for complete search history.

(56) References Cited

U.S. PATENT DOCUMENTS

| | | | |
|---|---|---|---|
| 3,867,162 A | 2/1975 | Elste | |
| 4,464,286 A | 8/1984 | Schilling | |
| 6,384,112 B1 | 5/2002 | Boussad | |
| 7,767,015 B2 | 8/2010 | Hurtado et al. | |
| 8,158,696 B2 | 4/2012 | Guzman et al. | |

(Continued)

FOREIGN PATENT DOCUMENTS

| | | | | |
|---|---|---|---|---|
| CN | 102337036 A | 2/2012 | | |
| CN | 106977431 A | * 7/2017 | .......... | B01F 17/0057 |

(Continued)

OTHER PUBLICATIONS

Machine Translation of CN-111320764-A (Year: 2020).*

(Continued)

*Primary Examiner* — Amber R Orlando
*Assistant Examiner* — Sarah Catherine Case
(74) *Attorney, Agent, or Firm* — Ingrassia, Fisher & Lorenz LLP

(57)      ABSTRACT

Asphalt emulsions and methods of forming an asphalt emulsion are provided. In one example, the asphalt emulsion includes a base asphalt component present in an amount of from about 40 to about 60 wt. % of the asphalt emulsion. Water is present in an amount of from about 40 to about 60 wt. % of the asphalt emulsion. An oxidized high-density polyethylene wax is present in an amount of from about 0.5 to about 5.0 wt. % of the asphalt emulsion. A slow-setting cationic emulsifier is present in an amount of from about 1.0 to about 2.0 wt. % of the asphalt emulsion.

11 Claims, 1 Drawing Sheet

(56)         References Cited

U.S. PATENT DOCUMENTS

| 8,658,717 B2 | 2/2014 | Rotz et al. |
| 2011/0174195 A1 | 7/2011 | Lesueur et al. |
| 2013/0042792 A1 | 2/2013 | Stuart et al. |
| 2014/0135431 A1 | 5/2014 | Moran et al. |
| 2016/0201271 A1 | 7/2016 | Clopotel et al. |
| 2019/0077710 A1 | 3/2019 | Yuan et al. |

FOREIGN PATENT DOCUMENTS

| CN | 111320764 A | * | 6/2020 | ........... C07C 231/12 |
| CN | 112011134 A | | 12/2020 | |
| JP | S58217551 A | | 12/1983 | |
| JP | 2009509073 A | | 3/2009 | |
| JP | 2011511187 A | | 4/2011 | |

OTHER PUBLICATIONS

MCA Product Data Sheet—Cationic Slow-Setting Asphalt Emulsion (Year: 2020).*
Machine Translation of CN-106977431-A (Year: 2017).*
Human-assisted Translation of CN106977431A (Year: 2017).*
Human-assisted Translation CN111320764A (Year: 2020).*

* cited by examiner

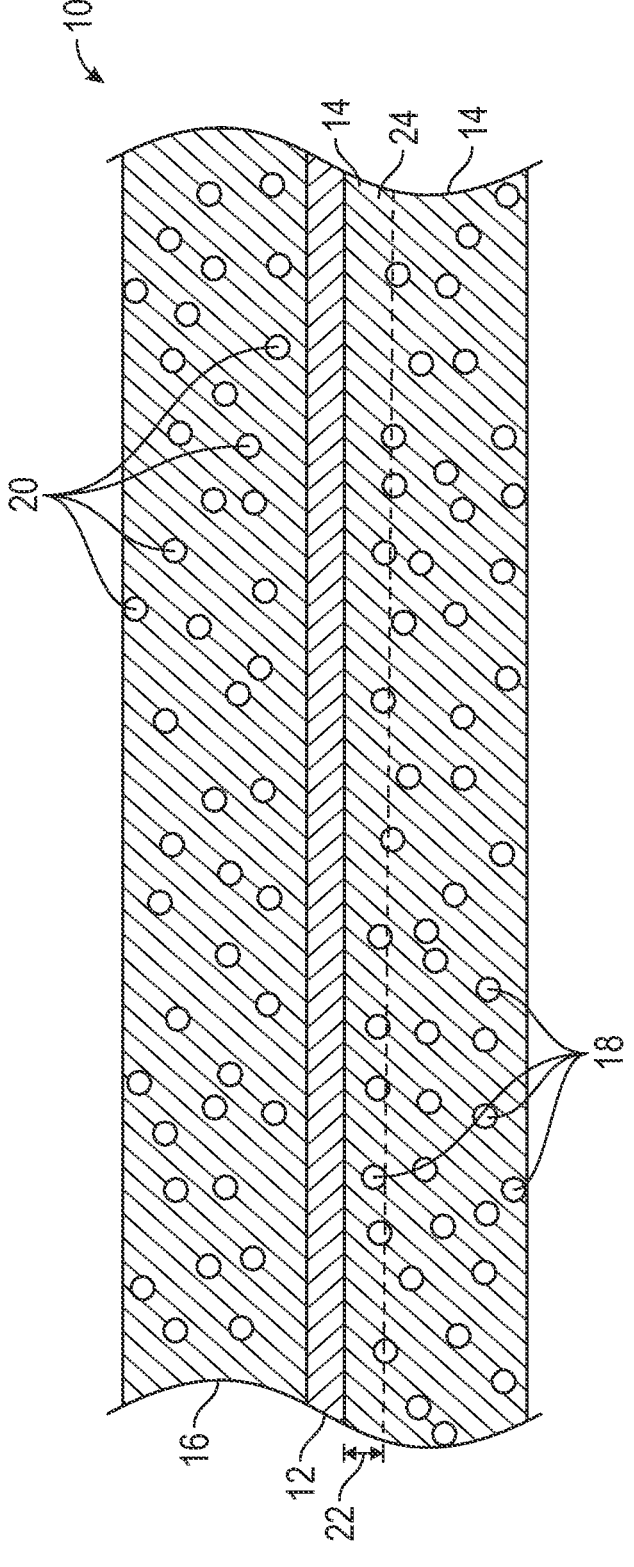

ASPHALT EMULSION AND METHOD OF FORMING THE SAME

CROSS-REFERENCE TO RELATED APPLICATIONS

This application is related to and claims all available benefit of U.S. Provisional Patent Application 63/175,745 filed Apr. 16, 2021, the entire contents of which are herein incorporated by reference.

TECHNICAL FIELD

The technical field relates generally to asphalt emulsions and methods of forming asphalt emulsions, and more particularly, relates to asphalt emulsions having high permeability and methods of forming such asphalt emulsions.

BACKGROUND

Asphalt, or bitumen, is commonly collected or synthesized and refined for use in applications such as paving, roofing, sealing, and water-proofing applications. Asphalt, often referred to as "asphalt binder" or "asphalt cement", is often mixed with aggregate to form material used in asphalt paving. To effectively mix the asphalt with the aggregate material, the asphalt is often provided in an asphalt emulsion that is free of aggregate. Asphalt emulsions are also employed in applications that do not involve mixing with aggregate, e.g., the asphalt emulsions themselves may be employed for end applications such as to form a prime coat or other aggregate-free coatings and/or layers in a composite paving structure such as fog seal, tack coat, seal coat, or the like.

Particularly, composite paving structures generally include a semi-rigid base layer(s) that is overlaid with an asphalt pavement/concrete layer(s). The semi-rigid base layer and the asphalt pavement layer are generally porous, each layer having void space. When it rains, for example, water can permeate through these layers and cause damage to them and/or the foundation they are built on. A prime coat is often, for example, spray applicated on top of the semi-rigid base layer(s) and permeates into the void space of the semi-rigid base layer. This promotes good bonding between the semi-rigid base layer and the asphalt pavement layer and further enhances the waterproof performance of the semi-rigid base layer, thereby preventing damage.

Unfortunately, current prime coats utilize liquid asphalt compositions that dissolve asphalt into solvents such as diesel or kerosene. These prime coats are both costly and unhealthy for the environment. Furthermore, current prime coats only have a penetration of 2-3 mm into the semi-rigid base layer. These prime coats can be easily destroyed by dump trucks, for example. Some attempted solutions include increasing water content and thereby reduced solid content to decrease viscosity of the prime coat and thereby increase permeability of the prime coat into the semi-rigid base layer. However, these diluted prime coats cannot prevent moisture infraction into the semi-rigid base layer, and therefore cannot protect the base layer from damage.

Accordingly, it is desirable to provide an asphalt emulsion that addresses one or more of the foregoing issues, and a method of forming such asphalt emulsions. Furthermore, other desirable features and characteristics of the various embodiments described herein will become apparent from the subsequent detailed description and the appended claims, taken in conjunction with the accompanying drawings and this background.

SUMMARY

Asphalt emulsions and methods of forming an asphalt emulsion are provided herein. In accordance with an exemplary embodiment, an asphalt emulsion includes a base asphalt component present in an amount of from about 40 to about 60 wt. % of the asphalt emulsion. Water is present in an amount of from about 40 to about 60 wt. % of the asphalt emulsion. An oxidized high-density polyethylene wax is present in an amount of from about 0.5 to about 5.0 wt. % of the asphalt emulsion. A slow-setting cationic emulsifier is present in an amount of from about 1.0 to about 2.0 wt. % of the asphalt emulsion.

In accordance with an exemplary embodiment, a method of forming an asphalt emulsion includes forming a base asphalt emulsion including a base asphalt component, a slow-setting cationic emulsifier, and water. An oxidized high-density polyethylene wax emulsion is formed separate from the base asphalt emulsion. The oxidized high-density polyethylene wax emulsion includes an oxidized high-density polyethylene wax and water. The oxidized high-density polyethylene wax has an acid value of from about 5 to about 50 mg KOH/g. The base asphalt emulsion and the oxidized high-density polyethylene wax emulsion are combined to form the asphalt emulsion. The base asphalt component is present in the asphalt emulsion in an amount of from about 40 to about 60 wt. % of the asphalt emulsion. Water is present in the asphalt emulsion in an amount of from about 40 to about 60 wt. % of the asphalt emulsion. The oxidized high-density polyethylene wax is present in the asphalt emulsion in an amount of from about 0.5 to about 5.0 wt. % of the asphalt emulsion. The slow-setting cationic emulsifier is present in the asphalt emulsion in an amount of from about 1.0 to about 2.0 wt. % of the asphalt emulsion.

In accordance with an exemplary embodiment, an asphalt emulsion includes a base asphalt component present in an amount of from about 40 to about 60 wt. % of the asphalt emulsion. Water is present in an amount of from about 40 to about 60 wt. % of the asphalt emulsion. An oxidized high-density polyethylene wax is present in an amount of from about 0.5 to about 5.0 wt. % of the asphalt emulsion. A slow-setting cationic emulsifier is present in an amount of from about 1.0 to about 2.0 wt. % of the asphalt emulsion. Glacial acetic acid is present in an amount of from about 0.05 to about 0.40 wt. % of the asphalt emulsion. A stabilizer is present in an amount of from about 0.01 to about 0.05 wt. % of the asphalt emulsion. An emulsifier is present in an amount of from about 0.25 to about 2.0 wt. % of the asphalt emulsion.

BRIEF DESCRIPTION OF THE DRAWINGS

The various embodiments will hereinafter be described in conjunction with the following drawing figures, wherein like numerals denote like elements, and wherein:

FIG. 1 illustrates a cross-sectional side view of a composite pavement structure in accordance with an exemplary embodiment.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to asphalt emulsions and methods of forming the asphalt emulsions. The exemplary embodiments taught herein provide an asphalt emulsion including a base asphalt component that is present in the asphalt emulsion in an amount of from about 40 to about 50 weight percent (wt. %) of the asphalt emulsion. Water is present in the asphalt emulsion in an amount of from about 40 to about 60 wt. % of the asphalt emulsion. An oxidized high-density polyethylene wax (OxHDPE wax) is present in the asphalt emulsion in an amount of from about 0.5 to about 5.0 wt. % of the asphalt emulsion. In an exemplary embodiment, the OxHDPE wax provides excellent physical properties to the asphalt emulsion such as trackless adhesion, pull adhesion, and high softening point. These physical properties improve the performance of, for example, prime coats. A slow-setting cationic emulsifier is present in the asphalt emulsion in an amount of from about 1.0 to about 2.0 wt. % of the asphalt emulsion. In an exemplary embodiment, the slow-setting cationic emulsifier prevents water from evaporating out of the asphalt emulsion too rapidly. When the asphalt emulsion is applied on top of an aggregate-containing layer, this provides the asphalt emulsion ample time to permeate further into the aggregate-containing layer instead of resting on top and setting to form an overlaying layer with little to no permeation.

In an exemplary embodiment, advantageously, by including OxHDPE wax and slow-setting emulsifier in the asphalt emulsion in the amounts as specified above, a highly permeable asphalt emulsion having strong waterproof performance is achieved. Further, in an exemplary embodiment, the asphalt emulsion is used as a prime coat between a semi-rigid base layer and an asphalt pavement layer to advantageously promote good bonding between these layers.

As discussed above, the asphalt emulsion includes a base asphalt component, water, OxHDPE wax, and a slow-setting cationic emulsifier. In an exemplary embodiment, the asphalt emulsion is free of aggregate and other mineral materials. As used herein, the term "aggregate" is a collective term for mineral materials, such as, for example, sand, gravel, or crushed stone. Further, the asphalt emulsion is a liquid, i.e., flowable, at ambient temperatures of about 21° C. As used herein, the term "about" refers to an amount within acceptable manufacturing precision tolerances of, for example, +/−10%, such as +/−5%.

The base asphalt component, as referred to herein, is neat asphalt that is free of polymers. The neat asphalt is often a byproduct of petroleum refining or post refining operations and includes air-blown asphalt, blended asphalt, cracked or residual asphalt, petroleum asphalt, propane asphalt, straight-run asphalt, thermal asphalt, or the like. In an exemplary embodiment, the base asphalt component is present in the asphalt emulsion in an amount of from about 40 to about 60 wt. %, such as from about 40 to about 50 wt. %, for example from about 42.5 to about 47.5 wt. %, based on the total weight of the asphalt emulsion.

Water is present in the asphalt emulsion in an amount of from about 40 to about 60 wt. %, such as from about 45 to about 55 wt. %, for example from about 49 to about 51 wt. %, based on the total weight of the asphalt emulsion. Such amounts of water are sufficiently high enough to render the asphalt emulsion liquid, or flowable, at ambient temperatures of about 21° C. to enhance its permeability and sufficiently low enough to maintain a high solids content in the asphalt emulsion to enhance its waterproof performance.

The OxHDPE wax that is included in the asphalt emulsion can include one or more different types of oxidized high-density polyethylene wax. As used to herein, the term "high-density" includes oxidized polyethylene waxes having a density in excess of 0.95 $g/cm^3$, such as a density of from about 0.97 to about 1.01 $g/cm^3$, for example a density of about 0.99 $g/cm^3$.

As contemplated herein, the OxHDPE wax has an acid value of from about 5 to about 50 mg KOH/g, such as from about 20 to about 30 mg KOH/g, for example about 25 mg KOH/g. The acid value is indicative of a degree of oxidation of the OxHDPE wax, e.g., carboxyl group content. The acid value may be determined by titrating a solution of the OxHDPE wax with a 0.1 N alcoholic potassium hydroxide (KOH) solution to a visual "pink" end point using phenolphthalein as an indicator in accordance with conventional techniques.

In an exemplary embodiment, the OxHDPE has a number average molecular weight ($M_n$) of from about 1000 to about 30,000 Daltons, such as from about 1000 to about 10,000 Daltons. In an exemplary embodiment, the OxHDPE wax has a viscosity of from about 100 to about 20000 cP at 150° C. as measured in accordance with ASTM D4402. One example of a suitable OxHDPE wax includes, but is not limited to, Honeywell Titan® 7686 oxidized high-density polyethylene homopolymer, manufactured by Honeywell International Inc., which is headquartered in Morristown, N.J.

In embodiments, the OxHDPE wax is present in an amount of from about 0.5 to about 5.0 wt. %, such as from about 1.0 to about 4.0 wt. %, for example from about 1.2 to about 3.7 wt. %, based on the total weight of the asphalt emulsion.

In an exemplary embodiment, the slow-setting cationic emulsifier is present in the asphalt emulsion in an amount of from about 1.0 to about 2.0 wt. %, such as from about 1.0 to about 1.5 wt. %, for example from about 1.2 to about 1.5 wt. %, based on the total weight of the asphalt emulsion. In an exemplary embodiment, the slow-setting cationic emulsifier is an acidified amide salt. For example, the slow-setting cationic emulsifier is selected from the group of primary and secondary acidified amide salts. This means that the nitrogen atom in the amide functional group has at least one N—H bond and that the nitrogen atom is positively charged. Such amounts and types of slow-setting cationic emulsifiers enhance the permeability of the asphalt emulsion into void spaces by, for example, retarding evaporation of water from the asphalt emulsion, thereby providing the asphalt emulsion more time to permeate into void spaces before setting. Additionally, such amounts and types of slow-setting cationic emulsifiers provide asphalt emulsions having lower water content with high permeability, thus increasing the solid content of the asphalt emulsion and correspondingly enhancing the asphalt emulsion's waterproof performance.

As will be discussed in further detail below and in an exemplary embodiment, the asphalt emulsion has an average penetration depth of at least about 4 cm, such as at least about 4.5 cm when applied to an underlying aggregate-containing asphalt layer. The underlying aggregate-containing asphalt layer is, for example, base road, semi-rigid base layer, or the like.

The balance of the asphalt emulsion may include one or more additional components that are included to enhance physical properties of the asphalt emulsion. For example, in an exemplary embodiment, the asphalt emulsion further includes one or more additional components selected from the group of glacial acetic acid, emulsifier(s), stabilizer(s), and pH adjuster(s).

In an exemplary embodiment, the glacial acetic acid is present in the asphalt emulsion in an amount of from about 0.05 to about 0.40 wt. %, such as from about 0.10 to about 0.40 wt. %, based on the total weight of the asphalt emulsion.

In an exemplary embodiment, the emulsifier(s) is tallow amine(s) substituted with two ethyleneoxy groups and is present in the asphalt emulsion in an amount of from about 0.25 to about 2.0 wt. %, such as from about 0.40 to about 1.50 wt. %, based on the total weight of the asphalt emulsion.

In an exemplary embodiment, the stabilizer(s) is sodium metabisulfite and is present in the asphalt emulsion in an amount of from about 0.01 to about 0.05 wt. %, based on the total weight of the asphalt emulsion.

In an exemplary embodiment, the pH adjuster(s) is hydrochloric acid and is present in the asphalt emulsion in an amount of from about 0.01 to about 0.15 wt. %, based on the total weight of the asphalt emulsion.

An exemplary method of forming the asphalt emulsion, as contemplated herein, will now be described. In accordance with an exemplary embodiment, a base asphalt emulsion and an OxHDPE wax emulsion are separately prepared prior to combining the respective emulsions to form the asphalt emulsion. In particular, the base asphalt emulsion is formed including the base asphalt component, the slow-setting cationic emulsifier, and water. In an exemplary embodiment, the base asphalt emulsion includes the base asphalt component in an amount of from about 45 to about 55 wt. % based on the total weight of the base asphalt emulsion, the slow-setting cationic emulsifier in an amount of from about 1.0 to about 2.0 wt. % based on the total weight of the base asphalt emulsion, and water in an amount of from about 45 to about 50 wt. % based on the total weight of the base asphalt emulsion. In an exemplary embodiment, the base asphalt emulsion further includes a pH adjuster such as hydrochloric acid in an amount of from about 0.5 to about 1.5 wt. % based on the total weight of the base asphalt emulsion. To be clear, the base asphalt emulsion is free of the OxHDPE wax. In an exemplary embodiment, the base asphalt emulsion is formed by mixing water, hydrochloric acid, and slow-setting cationic emulsifier to form soap, and subsequently running the soap and the base asphalt component through a colloidal mill to form the base asphalt emulsion.

Separate from the base asphalt emulsion, the OxHDPE wax emulsion is formed. The OxHPDE wax emulsion includes the OxHDPE wax and water, with the OxHDPE wax present in an amount of from about 20 to about 30 wt. % based on the total weight of the OxHDPE wax emulsion, and water present in an amount of from about 60 to about 65 wt. %, based on the total weight of the OxHDPE wax emulsion. To be clear, the OxHDPE wax emulsion emulsion is free of the base asphalt component. In an exemplary embodiment, the OxHDPE wax emulsion includes one or more additional components selected from the group of glacial acetic acid, sodium metabisulfite, and tallow amine substituted with two ethyleneoxy groups. The OxHDPE wax emulsion may be formed at elevated temperatures, e.g., by combining the aforementioned components in a pressure vessel, sealing the pressure vessel, and heating the mixture to a temperature of at least about 130° C., such as about 145° C. and maintaining the temperature in that range for a period of about 20 minutes while continuously mixing. After forming the OxHDPE wax emulsion, the OxHDPE wax emulsion is cooled to a temperature of less than or equal to about 30° C., such as less than or equal to about 25° C. prior to combining the base asphalt emulsion and the OxHDPE wax emulsion.

After cooling the OxHDPE wax emulsion, the base asphalt emulsion and the OxHDPE wax emulsion are combined to form the asphalt emulsion by, for example, blending. In an exemplary embodiment, the asphalt emulsion includes the base asphalt emulsion in an amount of from about 85 to about 95 wt. % based on the total weight of the asphalt emulsion and the OxHDPE wax emulsion in an amount of from about 5 to about 15 wt. % based on the total weight of the asphalt emulsion. The base asphalt emulsion and the OxHDPE wax emulsion are combined at relatively low temperatures, e.g., at a composition temperature of from about 15 to about 30° C. As used herein, the phrase "composition temperature" refers independently to the average temperature of the base asphalt emulsion and the OxHDPE wax emulsion. For example, "a composition temperature of from about 15 to about 30° C." means that the average temperature of the base asphalt emulsion is from about 15 to about 30° C. and that the average temperature of the OxHDPE wax emulsion is from about 15 to about 30° C. The asphalt emulsion is free of aggregate and other mineral materials, and the asphalt emulsion may be stored or immediately employed to form an appropriate layer in a composite pavement structure.

Referring to FIG. 1, an exemplary composite pavement structure 10 is shown. The composite pavement structure 10 includes a semi-rigid base layer 14, an asphalt pavement layer 16, and optionally a track coat layer 12. The semi-rigid base layer 14 and the asphalt pavement layer each includes void spaces 18 and 20, respectively. The semi-rigid base layer 14 is an underlying aggregate-containing asphalt layer, e.g. a conventional base course, that includes aggregate and asphalt. After the semi-rigid base layer 14 is placed, the asphalt emulsion is applied, for example, by spraying the asphalt emulsion on top of the semi-rigid base layer 14. The asphalt emulsion permeates into the void spaces 18 of the semi-rigid base layer 14 to define an average penetration depth 22. In an exemplary embodiment, the average penetration depth is at least about 4.0 cm, such as at least about 4.5 cm. In an exemplary embodiment, the asphalt emulsion sets to form a prime coat 24. After the prime coat 24 has set, additional layers such as the track coat layer 12 may be applied. Then, the asphalt pavement layer 16 is overlayed. As illustrated, the asphalt pavement layer 16 is an aggregate-containing asphalt layer and is disposed on an opposite side of the track coat layer 12. However, it is to be appreciated that the asphalt pavement layer 16 may be free of aggregate or may be an ultra-thin course in accordance with conventional composite pavement structures. Further, although the composite pavement structure 10 is illustrated as having three layers, various alternate embodiment include the composite pavement structure having less than three layers but at least the semi-rigid base layer 14 that includes the prime coat 24 and the asphalt pavement layer 16, or as having more than three layers.

Examples

The following examples are provided for illustrative purposes only and are not meant to limit the various embodiments of the present disclosure in any way.

Preparation of Base Asphalt Emulsion

Base asphalt emulsions are prepared that include a base asphalt component, water, hydrochloric acid, and slow-setting cationic emulsifier as shown below in TABLE I, where all amounts are shown in wt. % based on the total weight of the base asphalt emulsion. The base asphalt emulsions are prepared by first preparing soap by mixing the water, hydrochloric acid, and slow-setting cationic emulsifier and then running the soap and the base asphalt component through a colloidal mill.

TABLE I

|  | Base Asphalt Emulsion |
| --- | --- |
| Base Asphalt Component | 50.0 |
| Emulsifier[1] | 1.5 |
| Hydrochloric Acid | 0.8 |
| Water | 47.7 |

[1]Emulsifier is slow-setting cationic emulsifier as described above.

Preparation of Oxidized High-Density Polyethylene Wax Emulsion

OxHDPE wax emulsions are separately prepared that include an OxHDPE wax and other components as shown below in TABLE II, where all amounts are shown in wt. % based on the total weight of the OxHDPE wax emulsion. The OxHDPE wax emulsions are prepared by sequentially combining all of the ingredients in a pressure vessel, followed by sealing the pressure vessel and heating to a temperature of 145° C. for a period of 20 minutes while mixing. The OxHDPE wax emulsion is then cooled to a room temperature of about 25° C. with continuous stirring.

TABLE II

|  | OxHDPE Wax Emulsion |
| --- | --- |
| OxHDPE Wax[2] | 24.4 |
| Emulsifier[3] | 9.8 |
| Acid[4] | 2.4 |
| Stabilizer[5] | 0.3 |
| Water | 63.1 |

[2]OxHDPE Wax is Honeywell Titan ® 7686 having a density of 0.99 g/cm³ and an acid value of 25 mgKOH/g.
[3]Emulsifier is tallow amine substituted with two ethyleneoxy groups.
[4]Acid is glacial acetic acid.
[5]Stabilizer is sodium metabisulfite.

Preparation of Asphalt Emulsion

Various examples and comparative examples of asphalt emulsions are prepared using the prepared base asphalt emulsions and OxHDPE wax emulsions. The asphalt emulsions are prepared by blending the base asphalt emulsions and the OxHDPE wax emulsions until homogeneous. TABLE III provides a listing of the components included in the asphalt emulsions with all amounts in wt. % based on the total weight of the respective asphalt emulsion. TABLE III further provides average penetration depth data for the asphalt emulsions.

TABLE III

|  | Ex. 1 | Ex. 2 | Ex. 3 | Comp. Ex. 1 | Comp. Ex. 2 | Comp. Ex. 3 |
| --- | --- | --- | --- | --- | --- | --- |
| Base Asphalt Emulsion, wt. % | 95 | 90 | 85 | 100 | 90 | 90 |
| OxHDPE Wax Emulsion, wt. % | 5 | 10 | 15 | 0 | 0 | 0 |
| Parrafin Wax Emulsion, wt. % | 0 | 0 | 0 | 0 | 10 | 0 |
| Homo Poly-ethylene Wax Emulsion, et. % | 0 | 0 | 0 | 0 | 0 | 10 |
| Average Penetration Depth, cm | 4.6 | 5.1 | 5.5 | 1.9 | 2.8 | 3.1 |

Average Penetration depth was measured by first weighing out 200 g of dry and clean standard sand having a mean particle diameter of 0.3-0.6 mm, placing it in an open plastic bottle with an inner diameter of 60 mm, and leveling the standard sand in the open plastic bottle. Then, 5 g of an asphalt emulsion was sprayed into the open plastic bottle with a glass funnel. After a period of about 24 hours, the penetration depth was measured by holding a ruler up to the plastic bottle to and measuring the depth that the asphalt emulsion penetrated the standard sand at four different locations to produce four data points. These four data points were then measured and averaged to provide the average penetration depth.

As shown in TABLE III, Ex. 1-3 each exhibit the desired average penetration depth of at least 4.5 cm while Comp. Ex. 1-3 did not achieve such average penetration depths. Accordingly, the use of the OxHDPE wax emulsion as described herein enhances the permeability of the asphalt emulsion as compared to asphalt emulsions using paraffin wax emulsions, homo polyethylene wax emulsions, or the like.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:
1. An asphalt emulsion comprising:
a base asphalt component present in an amount of from about 40 to about 60 wt. % of the asphalt emulsion;
water present in an amount of from about 40 to about 60 wt. % of the asphalt emulsion;
an oxidized high-density polyethylene wax present in an amount of from about 0.5 to about 5.0 wt. % of the asphalt emulsion; and
a slow-setting cationic emulsifier present in an amount of from about 1.0 to about 2.0 wt. % of the asphalt emulsion, wherein the slow-setting cationic emulsifier is selected from the group of primary and secondary acidified amide salts, and wherein the slow-setting cationic emulsifier comprises the primary acidified amide salts.

2. The asphalt emulsion of claim 1, wherein the oxidized high-density polyethylene wax has an acid value of from about 5 to about 50 mg KOH/g.

3. The asphalt emulsion of claim 1, wherein the slow-setting cationic emulsifier comprises the secondary acidified amide salts.

4. The asphalt emulsion of claim 1, wherein the oxidized high-density polyethylene wax is present in an amount of from about 1.0 to about 4.0% by weight.

5. The asphalt emulsion of claim 1, wherein the water is present in an amount of from about 45 to about 55% by weight.

6. The asphalt emulsion of claim 1, wherein the asphalt emulsion has an average penetration depth of at least about 4 cm when applied to an underlying aggregate-containing asphalt layer.

7. The asphalt emulsion of claim 1, wherein the asphalt emulsion has an average penetration depth of at least about 4.5 cm when applied to an underlying aggregate-containing asphalt layer.

8. The asphalt emulsion of claim 1, wherein the oxidized high-density polyethylene wax has an acid value of from about 20 to about 30 mg KOH/g.

9. The asphalt emulsion of claim 1, wherein the asphalt emulsion further comprises one or more additional components selected from the group of glacial acetic acid, a tallow amine substituted with two ethyleneoxy groups, sodium metabisulfite, and hydrochloric acid.

10. The asphalt emulsion of claim 1, wherein the asphalt emulsion is free of aggregate and other mineral materials.

11. An asphalt emulsion comprising:

a base asphalt component present in an amount of from about 40 to about 60 wt. % of the asphalt emulsion;

water present in an amount of from about 40 to about 60 wt. % of the asphalt emulsion;

an oxidized high-density polyethylene wax present in an amount of from about 0.5 to about 5.0 wt. % of the asphalt emulsion;

a slow-setting cationic emulsifier present in an amount of from about 1.0 to about 2.0 wt. % of the asphalt emulsion, wherein the slow-setting cationic emulsifier is selected from the group of primary and secondary acidified amide salts and wherein the slow-setting cationic emulsifier comprises a primary acidified amide salt;

glacial acetic acid present in an amount of from about 0.05 to about 0.40 wt. % of the asphalt emulsion;

a stabilizer present in an amount of from about 0.01 to about 0.05 wt. % of the asphalt emulsion;

an emulsifier present in an amount of from about 0.25 to about 2.0 wt. % of the asphalt emulsion; and a pH adjuster present in an amount of from about 0.01 to about 0.15 wt. % of the asphalt emulsion.

* * * * *